United States Patent
Barker

(10) Patent No.: US 9,474,262 B2
(45) Date of Patent: Oct. 25, 2016

(54) TROLLING TEASER

(76) Inventor: Clay S. Barker, Plantation, FL (US)

( * ) Notice: Subject to any disclaimer, the term of this patent is extended or adjusted under 35 U.S.C. 154(b) by 1282 days.

(21) Appl. No.: 13/240,904

(22) Filed: Sep. 22, 2011

(65) Prior Publication Data

US 2012/0066954 A1    Mar. 22, 2012

Related U.S. Application Data

(60) Provisional application No. 61/385,261, filed on Sep. 22, 2010.

(51) Int. Cl.
*A01K 97/02* (2006.01)
*A01K 91/08* (2006.01)

(52) U.S. Cl.
CPC .............. *A01K 97/02* (2013.01); *A01K 91/08* (2013.01)

(58) Field of Classification Search
CPC ...... A01K 97/02; A01K 91/08; A01K 85/01; A01K 91/06; A01K 97/04; A01K 97/05; A01K 85/005
USPC ........... 43/42.06, 44.99, 42.31, 42.22, 42.35, 43/42.36, 42.72, 43.1, 44.9
See application file for complete search history.

(56) References Cited

U.S. PATENT DOCUMENTS

| | | | | | |
|---|---|---|---|---|---|
| 2,709,317 | A | * | 5/1955 | Pease, Sr. | A01K 97/02 222/510 |
| 2,719,382 | A | * | 10/1955 | Schachte | A01K 91/06 43/42.06 |
| 2,729,912 | A | * | 1/1956 | Moffett | A01K 97/02 206/0.5 |
| 2,769,268 | A | * | 11/1956 | Miller | A01K 85/01 43/42.06 |
| 2,791,058 | A | * | 5/1957 | Bettini | A01K 85/01 206/0.5 |
| 2,797,517 | A | * | 7/1957 | Eriksen | A01K 85/01 43/42.05 |
| 3,221,436 | A | * | 12/1965 | Mikus | A01K 85/16 43/42.17 |
| 3,798,825 | A | * | 3/1974 | Popeil | A01K 93/00 43/44.9 |
| 4,267,658 | A | * | 5/1981 | Brown | A01K 97/02 43/42.06 |
| 4,437,256 | A | * | 3/1984 | Kulak | A01K 85/01 43/17.5 |
| 4,520,588 | A | * | 6/1985 | Hindermyer | A01K 85/01 43/17.6 |
| 4,603,502 | A | * | 8/1986 | MacDonald | A01K 97/02 43/41 |
| 4,685,242 | A | * | 8/1987 | Stanish | A01K 97/02 43/42.06 |
| 4,777,757 | A | * | 10/1988 | de Marees van Swinderen | A01K 85/01 43/41 |
| 4,924,620 | A | * | 5/1990 | Kimberley | A01K 97/02 43/44.9 |
| 5,174,059 | A | * | 12/1992 | Durbin | A01K 69/06 43/100 |
| 5,361,532 | A | * | 11/1994 | Moff | A01K 93/00 43/44.9 |
| 6,233,863 | B1 | * | 5/2001 | Dotson | 43/42.09 |
| 6,442,887 | B2 | * | 9/2002 | Sanquist | A01K 97/05 43/55 |
| 6,453,602 | B1 | * | 9/2002 | Russell | A01K 69/06 43/100 |
| 2006/0075676 | A1 | * | 4/2006 | Turner | A01K 85/12 43/17.6 |
| 2006/0174534 | A1 | * | 8/2006 | Melhorn et al. | 43/42.06 |
| 2008/0236020 | A1 | * | 10/2008 | Murrell | A01K 83/06 43/4.5 |
| 2009/0255164 | A1 | * | 10/2009 | Jones | 43/4.5 |
| 2013/0133241 | A1 | * | 5/2013 | Barker | A01K 97/02 43/44.9 |

FOREIGN PATENT DOCUMENTS

| | | | | | |
|---|---|---|---|---|---|
| FR | 2579071 | A1 | * | 9/1986 | A01K 97/02 |
| GB | 2128061 | A | * | 4/1984 | A01K 97/02 |
| GB | 2132862 | A | * | 7/1984 | A01K 97/02 |
| GB | 2196821 | A | * | 5/1988 | A01K 97/02 |
| GB | 2215171 | A | * | 9/1989 | A01K 97/02 |
| JP | 2012187090 | A | * | 10/2012 | A01K 97/02 |

* cited by examiner

*Primary Examiner* — Kathleen Alker
(74) *Attorney, Agent, or Firm* — Robert M. Schwartz; Alfred K. Dassler

(57) ABSTRACT

A trolling teaser including a tubular hull having at least one substantially planar end face. The planar end face is an external face of the hull that is directly impinged upon by water as the teaser is trolled through the water. The tubular hull has a circumference defined by a wall. A plurality of channels is formed in the wall of the tubular hull.

15 Claims, 5 Drawing Sheets

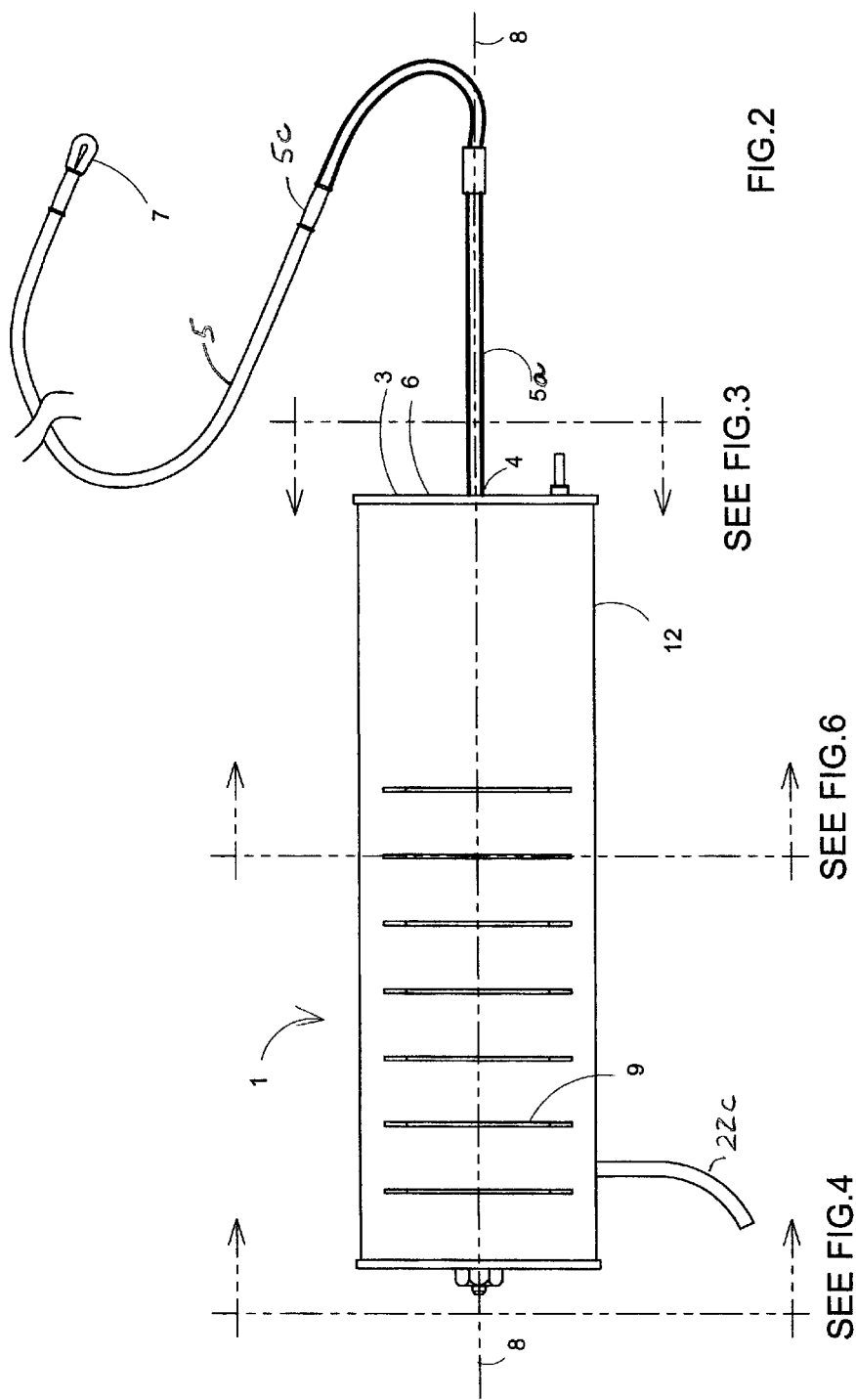

SECTION THRU ITEM 9
SEE FIG.2

TROLLING TEASER

CROSS-REFERENCE TO RELATED APPLICATIONS

This application claims the benefit of U.S. Provisional Application Ser. No. 61/385,261, filed on Sep. 22, 2010, entitled Trolling Teaser; the prior application is herewith incorporated by reference in its entirety.

BACKGROUND OF THE INVENTION

1. Field of the Invention

The invention relates to a teaser for fishing, more specifically, to a trolling teaser for attracting fish while trolling.

2. Description of the Related Art

The present invention pertains to a trolling teaser that is used for trolling for fish. The present invention is an improvement over existing trolling teasers in that it travels through the water without spinning or jumping out of the water. This improvement makes the trolling teaser more effective in attracting fish to a spread.

Trolling teasers can be used to target/attract many different species of fish. Trolling teasers presently in common use include artificial "birds", strings of small flashing spinners, painted boards and the like. Existing teasers are attached by a line at the front end of the teaser to drag or pull the teaser through the water.

The disadvantages of existing trolling teasers are that they twist or rotate in the water, jump out of the water, dive excessively and or erratically, or that they are not realistic enough to properly attract fish when being trolled.

SUMMARY OF THE INVENTION

It is accordingly an object of the invention to provide a trolling teaser which overcomes the above-mentioned disadvantages of the heretofore-known devices of this general type and which provides a teaser, which is easy-to-use, operate, and to assemble.

With the foregoing and other objects in view there is provided, a trolling teaser including a tubular hull having at least one substantially planar end face. The tubular hull has a circumference defined by a wall. A plurality of channels is formed in the wall of the tubular hull.

In accordance with another feature of the invention, there are end caps disposed at opposite ends of the tubular hull. A line has a first end affixed to a first one of the end caps. The line extends through a length of the tubular hull and passes through a second one of the end caps.

In accordance with a further feature of the invention, there is a tubular body disposed within the tubular hull. The tubular body has removable end plugs at opposite ends thereof.

In accordance with an added feature of the invention, tubular body is concentric with the tubular hull. The line passes through the tubular body, and the end plugs are affixed to the end caps.

In accordance with an additional feature of the invention, there is a pressurizing tube having a first end opening out of the second one of the end caps. The pressurizing tube has a second end opening into a chamber of the tubular body. A dispersion tube has a first end opening into the chamber of the tubular body. A second end projects from the tubular hull.

In accordance with another mode of the invention, the dispersion tube includes a flow control valve for regulating a flow of contents of the chamber of the tubular body.

In accordance with a further mode of the invention, there is a ring disposed between the tubular body and the tubular hull. The ring is a buoyancy regulating device for the trolling teaser.

In accordance with an additional mode of the invention, there is a snap attached to the line. An eye hook is secured to the first one of the end caps. The eye hook and the snap affix the line to the first one of the end caps.

In accordance with still a further mode of the invention, there is a chafing tube disposed on the line for protecting the line.

In accordance with another mode of the invention, an elastic sleeve is slideably disposed on the line. The sleeve is for abutting the second one of the end caps.

In accordance with yet another mode of the invention, the plurality of channels are spaced apart in a longitudinal direction of the tubular hull, the channels are orthogonal to a longitudinal axis of the tubular hull, and are formed opposite one another on opposite sides of the tubular hull.

With the objects of the invention in view, there is also provided a tubular hull. End caps disposed at opposite ends of the tubular hull. A line has a first end affixed to a first one of the end caps. The line extends through a length of the tubular hull and passes through a second one of the end caps out of the tubular hull.

In accordance with yet another feature of the invention, the second one of the end caps has a planar end face.

In accordance with still yet another feature of the invention, the tubular hull has a circumference defined by a wall. The wall has plurality of channels formed in the wall of the tubular hull. The plurality of channels is spaced apart in a longitudinal direction of the tubular hull and is formed opposite one another on opposite sides of the tubular hull.

Other features which are considered as characteristic for the invention are set forth in the appended claims.

Although the invention is illustrated and described herein as embodied in a trolling teaser, it is nevertheless not intended to be limited to the details shown, since various modifications and structural changes may be made therein without departing from the spirit of the invention and within the scope and range of equivalents of the claims.

The construction and method of operation of the device, however, together with additional objects and advantages thereof will be best understood from the following description of specific embodiments when read in connection with the accompanying drawings.

BRIEF DESCRIPTION OF THE DRAWINGS

FIG. 2 is a side elevational view of the trolling teaser according to the invention;

DESCRIPTION OF THE PREFERRED EMBODIMENTS

Figure 1:
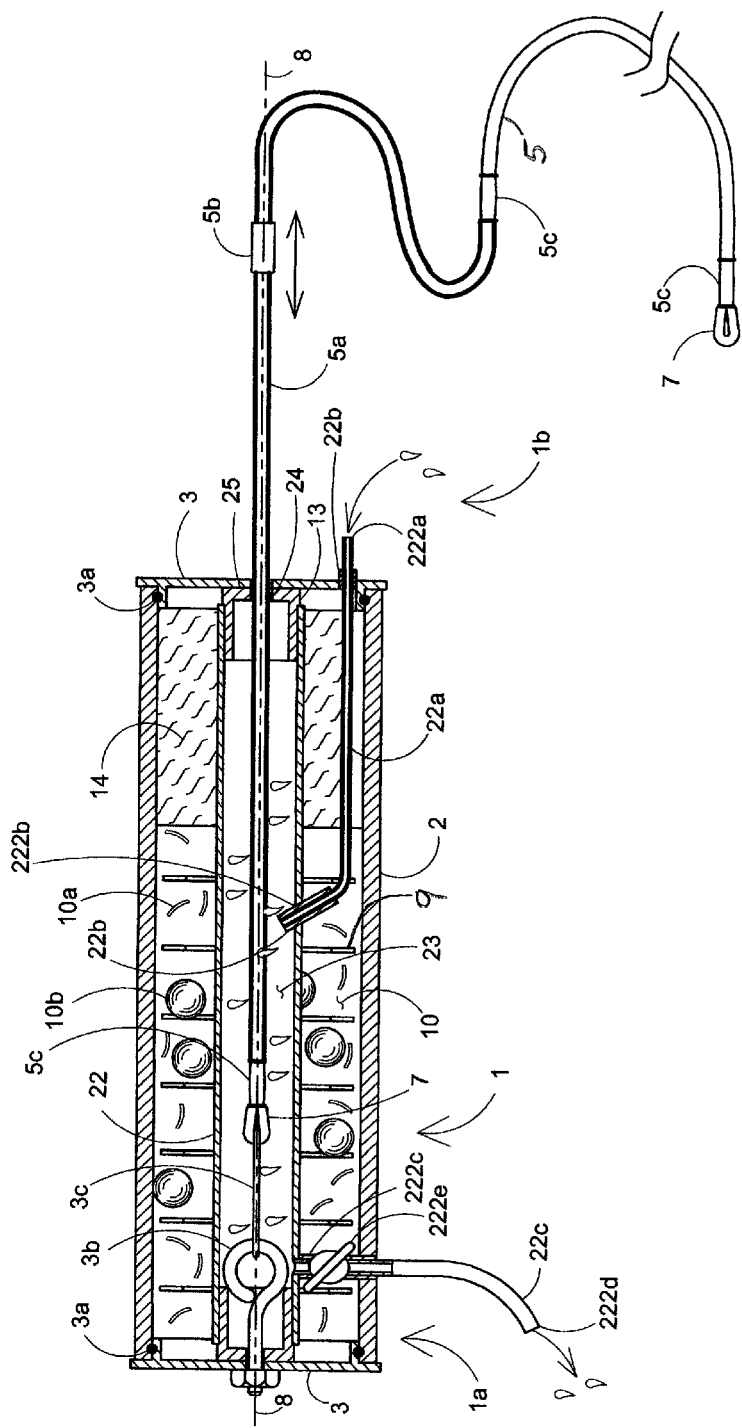
FIG. 1 is cross sectional view of the trolling teaser according to the invention.
Figure 1A:
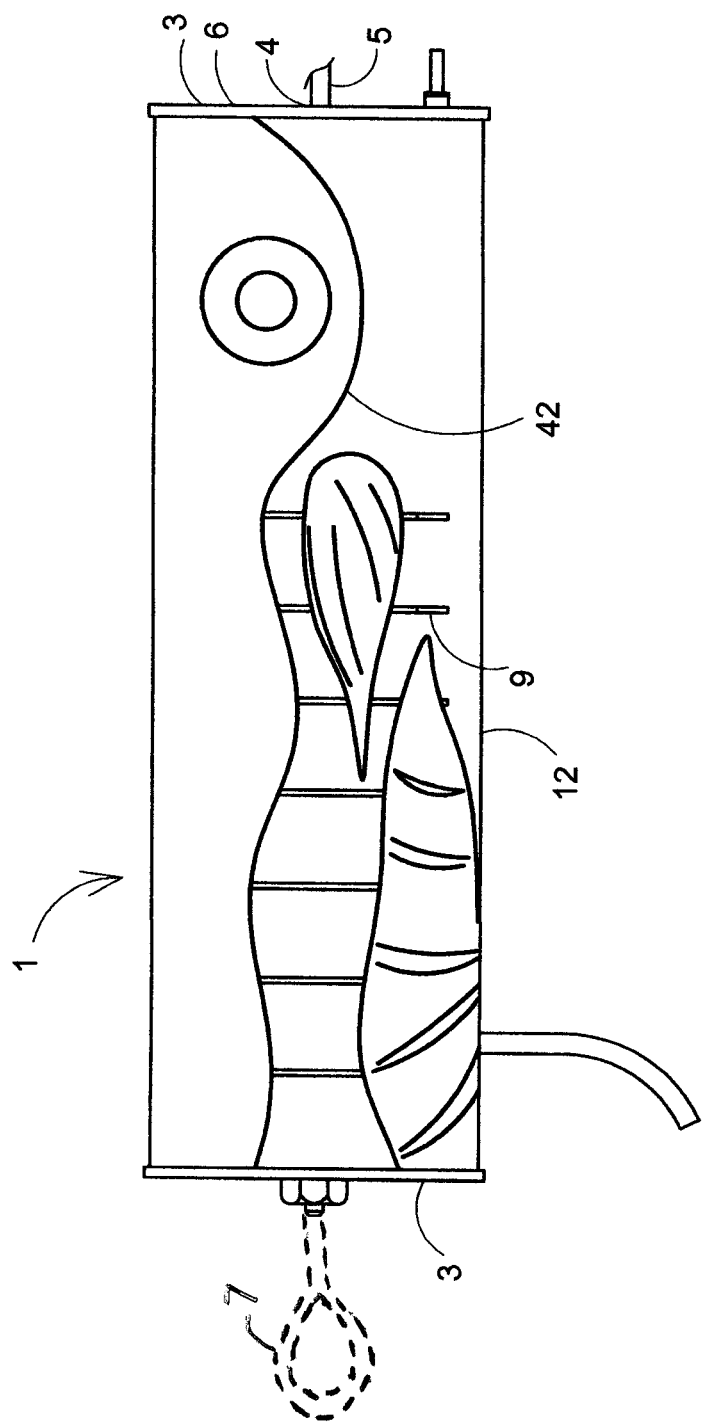
FIG. 1A is a partial side elevational view of the trolling teaser according to the invention.
Figure 4:
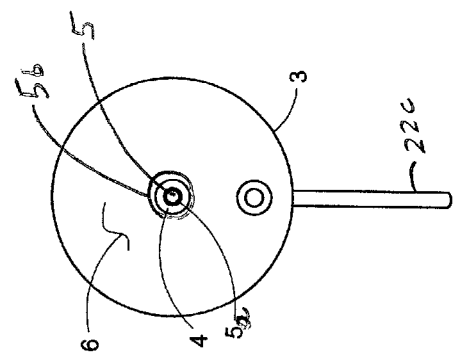
FIG. 4 is an end view of an aft end of the trolling teaser according to the invention.
Figure 3:
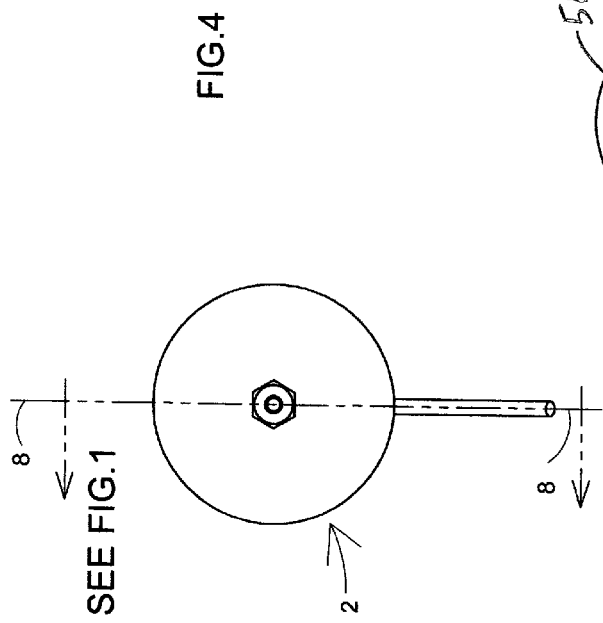
FIG. 3 is an end view of a leader end of the trolling teaser according to the invention.

FIGS. 1 and 2 of the instant application show a tubular hull 2 of the trolling teaser 1. The tubular hull 2 is provided with end caps or plugs 3. At least one of the end caps 3 has an opening 4 formed therein for receiving a line 5 therethrough. The opening 4 is configured to allow the end cap 3 to slide along the line 5. The line 5 provides an attachment to allow the trolling teaser 1 to be trolled behind a boat and serves as a leader for the teaser 1. An O-ring 3a serves to help retain the end plug 3 in the tubular hull 2.

The line 5 can be monofilament fishing line or fishing wire. The line 5 can be disposed inside a chafing tube 5a, which serves to protect the line 5 where the line passes through and comes into contact with the end plug 3. The chafing tube 5a can be fixed on the line 5 by crimps 5c which fix the chafing tube 5a relative to the line 5. At least one of the end caps 3 preferably has a substantially planar outer face 6. The line 5 may be provided with loops 7 at opposite ends of the line 5. The loops 7 can be constructed using crimps 5c. One loop 7 defines a leader portion of the line 5 and allows for the trolling teaser 1 to be attached to for trolling, while the other loop 7 may serve to replicate a tail of a fish by being disposed on an external side of the end plug 3 at the tubular hull 2. Alternatively, the other loop 7 may be affixed to an eye hook 3b which is affixed to the end plug 3 within the tubular hull 2. The loop 7 may be releasably attached to the eye hook 3b by a snap 3c. This provides an effective and simple way to interchange the end plugs 3 to provide different color plugs 3. In either case, the loop 7 affixes the line 5, on an aft or rear end 1a of the trolling teaser 1 opposite the leader portion of the line 5 and allows the line 5 to run the length of the tubular hull 2. Applicant has discovered that attachment of the line 5 to the aft end 1a of the trolling teaser 1 causes the teaser to be pushed through the water. By pushed through the water, it is meant that contrary to existing teasers/lures, which are affixed at the nose, the attachment of the line 5 to the aft end 1a of the teaser 1 results in the teaser 1 being pulled by force applied from the line 5 at the aft end of the teaser 1. In other words, the teaser 1 is pushed through the water as opposed to being pulled by front end of the teaser. Applicant has discovered that the feature of providing the pulling force at the aft end 1a of the teaser 1 and guiding a front end of the teaser with the line 5, which resulted from providing an assembly of the teaser 1 to allow oil and chum to be provided within the teaser 1, unexpectedly increases the stability and provides consistent movement (dives/moves in a repeatable pattern) of the teaser 1, while being trolled.

Furthermore, the line 5 includes and an elastic sealing sleeve 5b, which slides on the line 5 or chafing tube 5a and which serves to fluidically seal the opening 4 of the cap 3 on the leader side 1b of the teaser by abutting the cap 3. The elastic sleeve 5b also acts as a keeper, or in other words, the sleeve 5b is frictionally engaged with the line 5 or chafing tube 5a so as to help hold the end cap 3 at the tubular body hull 2.

The tubular hull 2 has a longitudinal axis 8 and a cavity 10. The tubular hull 2 has a plurality of slits or channels 9 formed in a wall 12 defining a circumference of the tubular hull 2. The slits 9 are spaced apart along the hull 2 in the direction of the longitudinal axis 8. Surprisingly, it has been found that the slits 9 provide stability and help prevent rotation of the trolling teaser 1 while trolling. The slits 9 lower the pressure on the sides of the tube, disrupting the water flow on the sides of the tube, which results in a cavitation, or pockets of air on the sides of the teaser 1 of about 12 inches on each side or about 18 inches to 24 inches total width, while trolling the teaser. The slits 9 are preferably perpendicular to the longitudinal axis 8 of the tubular hull 2. It is also preferable that the slits 9 are disposed opposite one another on opposing halves of the tubular hull 2. The chamber 10 may be used for receiving chum 10a, and if the slits 9 are formed deep enough to penetrate through the entire thickness of the wall 10, the slits 9 also serve to allow the chum 10a in the chamber 10 to disburse into the water to create a chum stream which trails the teaser 1 as it is moving through the water. Alternatively, or at the same time, the chamber 10 can retain balls 10b which act as noisemakers to attract fish when the teaser 1 is trolled through the water.

Figure 6:
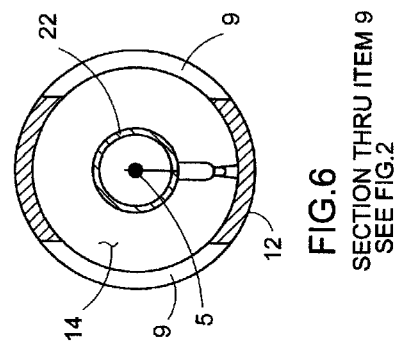
FIG. 6 is a cross-section view along the section line shown in FIG. 2.

The tubular hull 2 has a tubular body 22 disposed within the cavity 10 of the tubular hull 2. The tubular body 22 is concentric with the tubular hull 2 and has end caps or plugs 13 disposed thereon. One end of the cavity 10 of the tubular hull 2 is provided with ring 14, which surrounds the tubular body 22. The ring 14 is made up a material which regulates the buoyancy of the trolling teaser 1. The ring 14 may be made of foam or other similar material and can be moved along the longitudinal direction of the tubular hull 2. FIG. 6 shows that the ring 14 may be provided with cutouts which define gaps between the ring 14 and the tubular hull 2.

The tubular body 22 has a chamber 23 which is suitable for receiving fish oil or other scent attractants. The fish oil escapes the chamber 23 via opening 24 formed in the end plug 13 at the aft end 1a of the teaser hull 2. The openings 24 in the end caps 13 also serve to allow the line 5 to pass through the length of the trolling teaser 1. The end caps 13 have a planar outer face 25, which can abut the end plugs 3 and by which the end caps 13 can be affixed to the end plug 3. When the teaser 1 is trolled behind the boat 26 water enters front opening 4 and front opening 24 allowing fish oil to flow out of the rearward openings 4 and 24.

Alternatively, the tubular body 22 can be provided with a fish oil dispersion system to accurately control the flow rate of the oil from the chamber 23. The distribution system includes at least one tube 22a which passes through the end plug 3 that defines the leader side 1b of the teaser 1. Accordingly, a first end 222a of the tube 22a is subjected to on-flowing water as the teaser 1 is pulled through the water. The opposite end 222b of the tube 22a is fluidically connected to the chamber 23 of the tubular body 22. The tube 22a may be provided with elastic sleeves 22b at the connection points to the tubular body 22 and the end plug 3. Although not shown in the Figures, it is possible for the elastic sleeve 22b to be provided over the entire length of the tube 22a. The elastic sleeve 22b at the tubular body 22 serves to seal the tube 22a at the tubular body 22 and can also project into the chamber 23. The aft end 1a of the teaser 1 includes at least one dispersion tube 22c which has a first end 222c fluidically connected to the chamber 23 of the tubular body 22. An opposite end 222d of the dispersion tube 22c issues from the tubular hull 2 and communicates the oil from the chamber 23 to the surrounding water as the teaser 1 is trolled. The tube 22c may be provided with elastic sleeves 22b at the connection points to the tubular body 22 and the tubular hull 2. The elastic sleeve 22b at the tubular body 22 serves to seal the tube 22c at the tubular body 22 and may project into the chamber 23. Although not shown in the Figures, it is possible for the elastic sleeve 22b to be provided over the entire length of the dispersion tube 22c. It is also possible for the dispersion tube 22c to include a flow control valve 222e to regulate the flow of the oil from the chamber 23. If the oil dispersion system is provided, only one of the caps 13 needs to include an opening 24 to allow the line 5 to pass therethrough while the opposite end cap 13 is solid or constructed to have the eye hook 3b affixed thereon. During operation of the teaser, the tube 22a is subjected to the on-flowing water and increases the pressure within the chamber 23. The increase in pressure results in the oil being dispersed from the chamber 23 to the surrounding water via the dispersion tube 22c.

Figure 5:
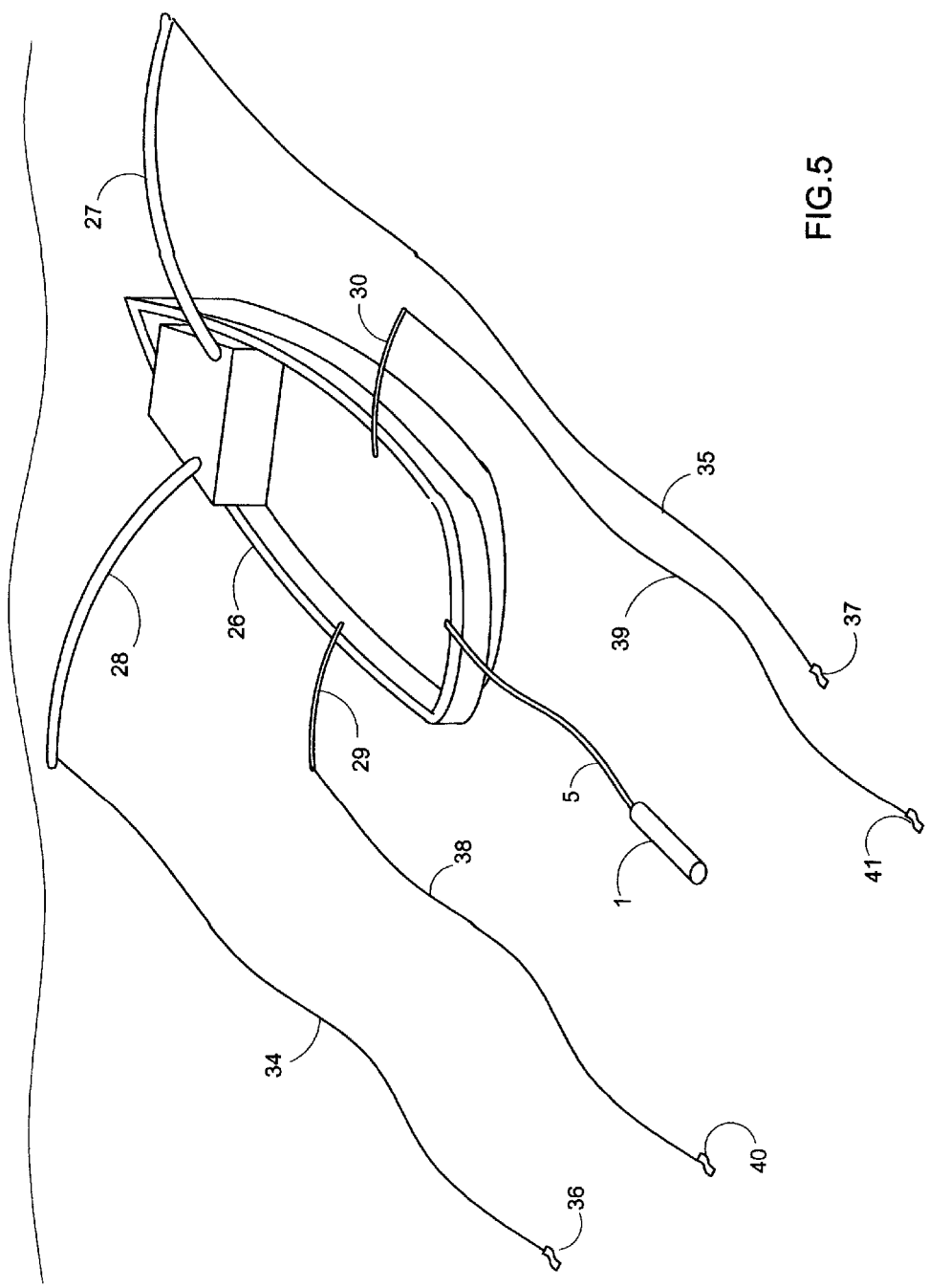
FIG. 5 is a perspective view of a marine vessel having a spread for trolling.

FIG. 5 shows that a boat 26 has a spread including two outriggers 27 and 28 and a pair of fishing rods 29 and 30. Fishing lines 34 and 35 of the outriggers 27 and 28 each have skirted baits 36 and 37. Fishing lines 38 and 39 (flat lines) of rods 29 and 30 also have skirted baits 40 and 41. The trolling teaser 1 is shown at the center of the spread.

The trolling teaser 1 can include a fish decoy design 42 painted on each side thereof. The slits 9 serve to maintain the teaser 1 in a stable manner when teaser 1 is trolled through the water, such that the teaser 1 does not rotate or spin the along longitudinal axis thereof, jump out of the water, roll, or dive excessively. Accordingly, the teaser 1 stays in a fixed orientation such that the fish design 42 does not rotate about axis 8. Furthermore, it has been found that the dispersion tube 22c projecting from the tubular hull 2 further stabilizes the teaser 1 during trolling.

I claim:

1. A trolling teaser comprising:
   a tubular hull;
   end caps disposed at opposite ends of said tubular hull, one of said end caps having at least one substantially planar end face, said at least one substantially planar end face being an external face that is configured to be directly impinged upon by water as the teaser is trolled through the water;
   a line having a first end affixed to a first one of said end caps, said line extending through a length of said tubular hull and passing through a second one of said end caps; and
   a tubular body disposed within said tubular hull;
   said tubular body having removable end plugs at opposite ends thereof;
   wherein said tubular body is concentric with said tubular hull, said line passes through said tubular body, and said end plugs are affixed to said end caps, said tubular hull having a circumference defined by a wall;
   a plurality of channels formed in said wall of said tubular hull.

2. The trolling teaser according to claim 1, further comprising:
   an elastic sleeve being slideably disposed on said line, said sleeve for abutting said second one of said end caps.

3. The trolling teaser according to claim 1, wherein said plurality of channels are spaced apart in a longitudinal direction of said tubular hull, said channels are orthogonal to a longitudinal axis of said tubular hull, and are formed opposite one another on opposite sides of said tubular hull.

4. A trolling teaser comprising:
   a tubular hull having a circumference defined by a wall;
   a plurality of channels formed in said wall of said tubular hull;
   end caps disposed at opposite ends of said tubular hull, one of said end caps having at least one substantially planar end face;
   a line having a first end affixed to a first one of said end caps, said line extending through a length of said tubular hull and passing through a second one of said end caps;
   a tubular body disposed within said tubular hull;
   said tubular body having removable end plugs at opposite ends thereof, said tubular body being concentric with said tubular hull, said line passing through said tubular body, and said end plugs being affixed to said end caps;
   a pressurizing tube having a first end opening out of said second one of said end caps, said pressurizing tube having a second end opening into a chamber of said tubular body; and
   a dispersion tube having a first end opening into said chamber of said tubular body and a second end projecting from said tubular hull.

5. The trolling teaser according to claim 4, wherein said dispersion tube includes a flow control valve for regulating a flow of contents of said chamber of said tubular body.

6. The trolling teaser according to claim 4, further comprising:
   a ring disposed between said tubular body and said tubular hull, said ring being a buoyancy regulating device for the trolling teaser.

7. The trolling teaser according to claim 6, further comprising:
   a snap attached to said line;
   an eye hook secured to said first one of said end caps, said eye hook and said snap affixing said line to said first one of said end caps.

8. The trolling teaser according to claim 6, further comprising:
   a chafing tube disposed on said line for protecting said line.

9. A trolling teaser comprising:
   a tubular hull;
   end caps disposed at opposite ends of said tubular hull, said end caps including a fore end cap and an aft end cap;
   a line having a first end affixed to said aft end cap, said line extending through a length of said tubular hull and passing through said fore end cap out of said tubular hull, said fore end cap having an opening formed therein said opening being sized for allowing said fore end cap to slide along said line; and
   a tubular body disposed within said tubular hull;
   said tubular body having removable end plugs at opposite ends thereof;
   wherein said tubular body is concentric with said tubular hull, said line passes through said tubular body, and said end plugs are affixed to said end caps.

10. The trolling teaser according to claim 9, wherein said fore end cap has a planar end face.

11. The trolling teaser according to claim 9, wherein said tubular hull has a circumference defined by a wall, said wall has a plurality of channels formed therein, said plurality of channels are spaced apart in a longitudinal direction of said tubular hull and are formed opposite one another on opposite sides of said tubular hull.

12. The trolling teaser according to claim 9, further comprising:
   a pressurizing tube having a first end opening out of said fore end cap, said pressurizing tube having a second end opening into a chamber of said tubular body;
   a dispersion tube having a first end opening into said chamber of said tubular body and a second end projecting from said tubular hull.

13. The trolling teaser according to claim 12, wherein said dispersion tube includes a flow control valve for regulating a flow of contents of said chamber of said tubular body.

14. The trolling teaser according to claim 13, further comprising:
   a ring disposed between said tubular body and said tubular hull, said ring being a buoyancy regulating device for the teaser.

15. The trolling teaser according to claim 14, further comprising:
   a snap attached to said line;
   an eye hook secured to said aft end cap, said eye hook and said snap affixing said line to said aft end cap.

* * * * *